United States Patent
Thomas et al.

(10) Patent No.: US 7,137,620 B2
(45) Date of Patent: Nov. 21, 2006

(54) DIFFUSER AND AN AERATION APPARATUS EQUIPPED WITH SUCH A DIFFUSER

(75) Inventors: Paul Anthony Thomas, Edmonton (CA); Harold Allen Kinasewich, Edmonton (CA)

(73) Assignee: Seair Inc., Edmonton (CA)

( * ) Notice: Subject to any disclaimer, the term of this patent is extended or adjusted under 35 U.S.C. 154(b) by 87 days.

(21) Appl. No.: 10/502,373

(22) PCT Filed: Jan. 25, 2002

(86) PCT No.: PCT/CA02/00091

§ 371 (c)(1),
(2), (4) Date: Jul. 23, 2004

(87) PCT Pub. No.: WO03/061814

PCT Pub. Date: Jul. 31, 2003

(65) Prior Publication Data

US 2005/0218533 A1    Oct. 6, 2005

(51) Int. Cl.
*B01F 3/04*        (2006.01)
(52) U.S. Cl. .................. 261/77; 261/120; 261/124
(58) Field of Classification Search ................. 261/28, 261/29, 77, 116, 120, 124; 210/220, 211.2, 210/242.2
See application file for complete search history.

(56) References Cited

U.S. PATENT DOCUMENTS

| 1,245,985 | A | * | 11/1917 | Saunders | 261/124 |
| 1,959,554 | A | * | 5/1934 | Stich | 261/124 |
| 2,305,796 | A | * | 12/1942 | Seidel | 261/122.1 |
| 3,671,022 | A | * | 6/1972 | Laird et al. | 261/29 |
| 3,794,303 | A | * | 2/1974 | Hirshon | 261/61 |
| 4,216,091 | A | * | 8/1980 | Mineau | 210/175 |
| 4,264,739 | A | * | 4/1981 | Grabner et al. | 435/393 |
| 4,504,388 | A | * | 3/1985 | Desbos et al. | 210/130 |
| 4,581,181 | A | * | 4/1986 | Nicholls | 261/91 |
| 4,760,028 | A | * | 7/1988 | deBruyne et al. | 435/302.1 |
| 4,911,836 | A | | 3/1990 | Haggerty | |
| 5,514,267 | A | | 5/1996 | Machiya et al. | |
| 5,587,113 | A | * | 12/1996 | Caballero Pichardo | 261/116 |
| 5,951,922 | A | | 9/1999 | Mazzei | |
| 2001/0009238 | A1 | * | 7/2001 | Mosheim et al. | 210/746 |

FOREIGN PATENT DOCUMENTS

| EP | 0 238 774 | | 9/1987 |
| EP | 0 673 885 | A2 | 9/1995 |
| EP | 0 827 940 | A1 | 3/1998 |
| EP | 0 854 295 | A1 | 7/1998 |
| JP | 07 060 088 | | 3/1995 |
| SU | 1 699 959 | | 12/1991 |

\* cited by examiner

*Primary Examiner*—Scott Bushey
(74) *Attorney, Agent, or Firm*—Christensen O'Connor Johnson Kindness PLLC (57) ABSTRACT

A diffuser (10) having a body (12) with a blind bore (18) having a closed impaction end (22). Fluids are diffused radially from the body (12) through slots (26). The diffuser (10) is characterized by a central slot (28), a lower slot (3) and an upper slot (32). The central slot (28) discharges a first fluid stream (34) substantially horizontally. The lower slot (30) discharges a second fluid stream (36) at an upward angle to impinge upon the first fluid stream (34). The upper slot (32) discharges a third fluid stream (38) at a downward angle to impinge upon the first fluid stream (34). The diffuser, as described above, has proven to be effective for use in aeration of water for aquaculture.

17 Claims, 9 Drawing Sheets

DIFFUSER AND AN AERATION APPARATUS EQUIPPED WITH SUCH A DIFFUSER

FIELD OF THE INVENTION

The present invention relates to a diffuser and, in particular, a diffuser that is suited for use in an aeration apparatus.

BACKGROUND OF THE INVENTION

There are various applications in which aeration apparatus are required. For example, it has been demonstrated that ponds used in aquaculture produce in greater abundance as oxygen levels in such ponds are increased. It is believed that the efficiency of the aeration apparatus used is tied to the efficiency of the diffuser used with the apparatus.

Soviet Union Patent 1699959 discloses a diffuser having a cylindrical body with an outer surface and an inner surface defining a blind bore. The blind bore has an open attachment end adapted for connection to a conduit and a closed impaction end. The body has radial slots, whereby fluids are diffused radially from the body through the slots.

SUMMARY OF THE INVENTION

What is required is a diffuser that will improve the efficiency of an aeration apparatus.

According to one aspect of the present invention there is provided a diffuser which includes a cylindrical body having an outer surface and an inner surface defining a blind bore. The blind bore has an open attachment end adapted for connection to a conduit and a closed impaction end. The body has radial slots, whereby fluids are diffused radially from the body through the slots.

The diffuser, as described above, has proven to be effective for use in aeration of water for aquaculture. There are, however, a number of refinements to the diffuser which will now be described that further improve performance efficiency.

It has been determined that better results can be obtained by lengthening the slots so that they are arcuate and extend around the outer surface of the cylindrical body. It has been determined that the diffuser operates best in a vertical orientation. It has been determined that it is better to have the slots converge from the inner surface to the outer surface. This increases the exit velocity of fluids diffused from the body through the slots. It has been determined that it is better when the slot configuration includes a central slot, a lower slot and an upper slot. The central slot discharges a first fluid stream substantially horizontally. The lower slot is positioned below the central slot and discharges a second fluid stream at an upward angle to impinge upon the first fluid stream. The upper slot is positioned above the central slot and discharges a third fluid stream at a downward angle to impinge upon the first fluid stream. The impinging streams provide the best results, as the impact promotes aeration. Experiments have been conducted with respect to the angle of the slots. It is preferred that the lower slot be angled at an upward angle of between 28 and 38 degrees and the upper slot is angled at a downward angle of between 28 and 38 degrees. A narrower recommended optimum range has the lower slot angled at an upward angle within a narrower range of about 32 to 34 degrees and the upper slot angled at a downward angle within a narrower range of about 32 to 34 degrees.

According to another aspect of the present invention there is provided an aeration apparatus which includes a primary conduit adapted for connection to a water source and a secondary conduit adapted for connection to a gas source. The gas is either oxygen gas or a gas that contains oxygen. A venturi is in fluid communication with both the primary conduit and the secondary conduit. The venturi is adapted to inject gas containing oxygen carried by the secondary conduit into water carried by the primary conduit. A diffuser, as previously described, is provided with the open attachment end of the blind bore connected to the primary conduit.

The preferred gas source is an oxygen generator, as it viewed as being more cost effective and practical in remote installations than oxygen tanks.

It is preferred that the diffuser be positioned in a diffusion chamber from which the water is drained. This allows the aerated water to be carried by discharge lines a physical distance away from the diffuser. In the absence of the diffusion chamber, the aeration apparatus would only be capable of aerating water in the immediate vicinity of the diffuser the diffusion chamber temporarily confines the water and oxygen filled environment, so that the oxygen cannot escape prior to being mixed with the water and thereby further promotes aeration.

It is preferred that the diffuser be mounted on a floating support. This facilitates using as the water source a pump mounted on the floating support. The pump has an intake positioned to draw water from a body of water on which the floating support is floating.

Although beneficial results may be obtained through the use of the aeration apparatus, as described above, the method of anchoring the aeration apparatus can have an effect on performance. The aeration apparatus must be anchored in a manner that will maintain it in a stable upright condition. However, aeration apparatus must be able to adjust as water levels rise and fall. Even more beneficial results may, therefore, be obtained when the floating support has anchor pins. The floating support is able to travel up and down the anchor pins as the water level rises and falls.

Although beneficial results may be obtained through the use of the aeration apparatus, as described above, it is preferred that the intake for the pump be enclosed within a screen, thereby preventing debris floating in the body of water from being drawn into the pump.

Although beneficial results may be obtained through the use of the aeration apparatus, as described above, the oxygen generator becomes less and less efficient as nitrogen builds up within the filtration sieve. Even more beneficial results may, therefore, be obtained when purge tanks are provided with purge lines extending from the purge tanks to the oxygen generator. This enables oxygen to be cycled periodically from the purge tanks to the oxygen generator to purge the oxygen generator.

Although beneficial results may be obtained through the use of the aeration apparatus, as described above, in order to maximum space utilization within the apparatus it is preferred that the purge tanks also serve as floats for the floating support.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

A diffuser generally identified by reference numeral 10 will now be described with reference to FIGS. 1 through 4. An aeration apparatus generally identified by reference numeral 100 into which diffuser 10 is incorporated will now be described with reference to FIGS. 5 through 10.

Figure 1:
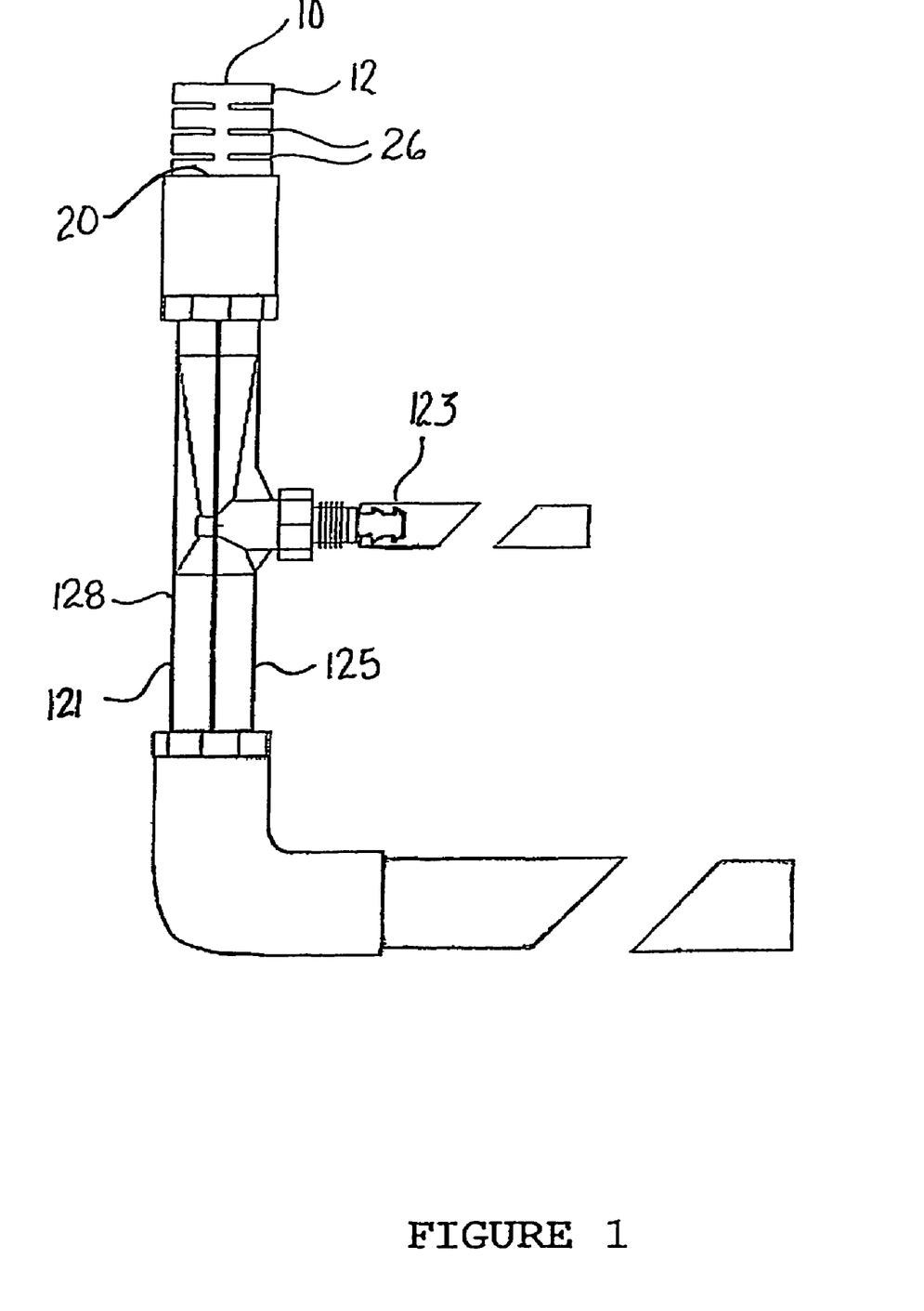
FIG. 1 is a side elevation view of a diffuser constructed in accordance with the teachings of the present invention mounted on an aeration apparatus.
Figure 2:
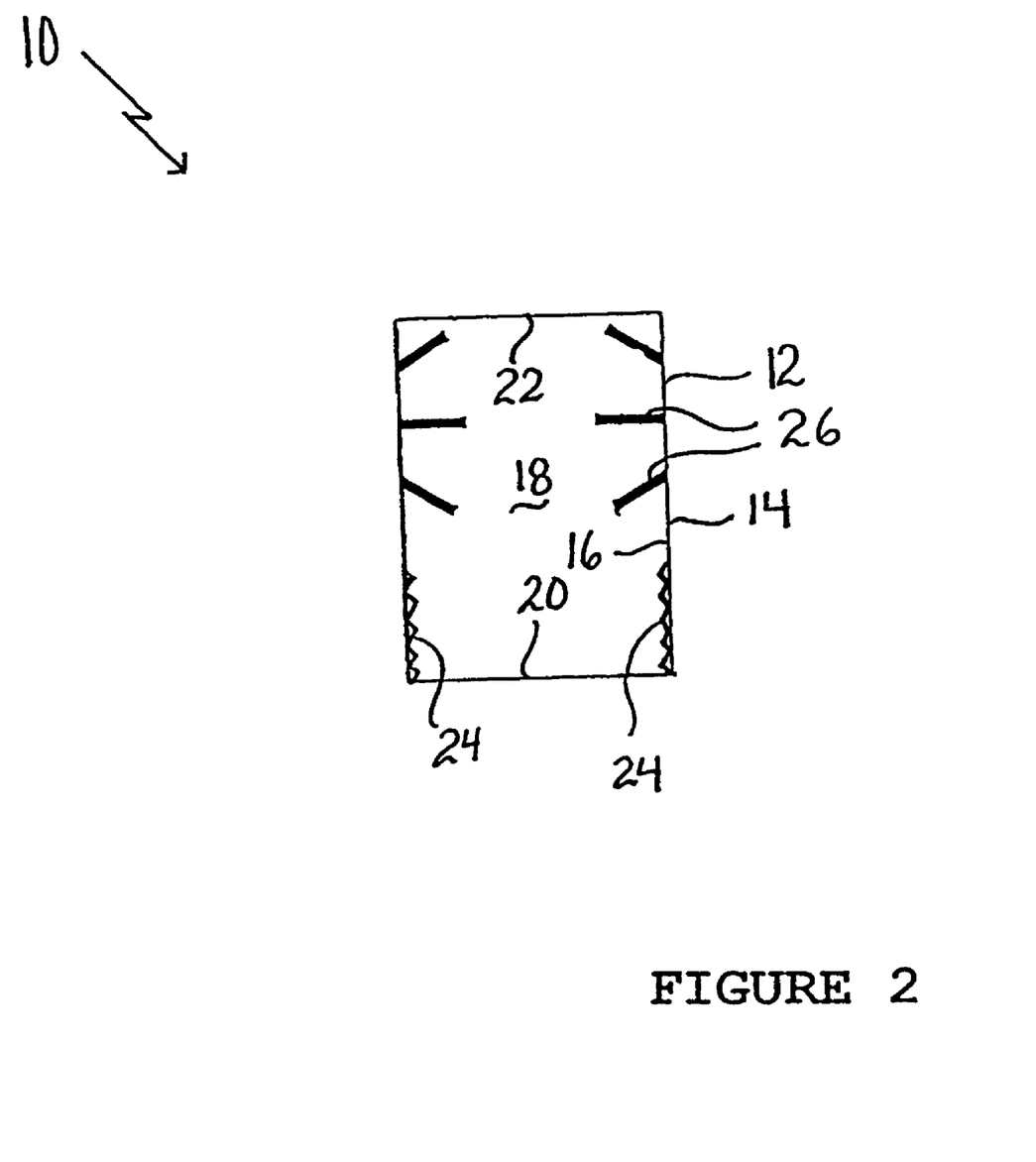
FIG. 2 is a side elevation view, in section, of the diffuser illustrated in FIG. 1.
Figure 3:
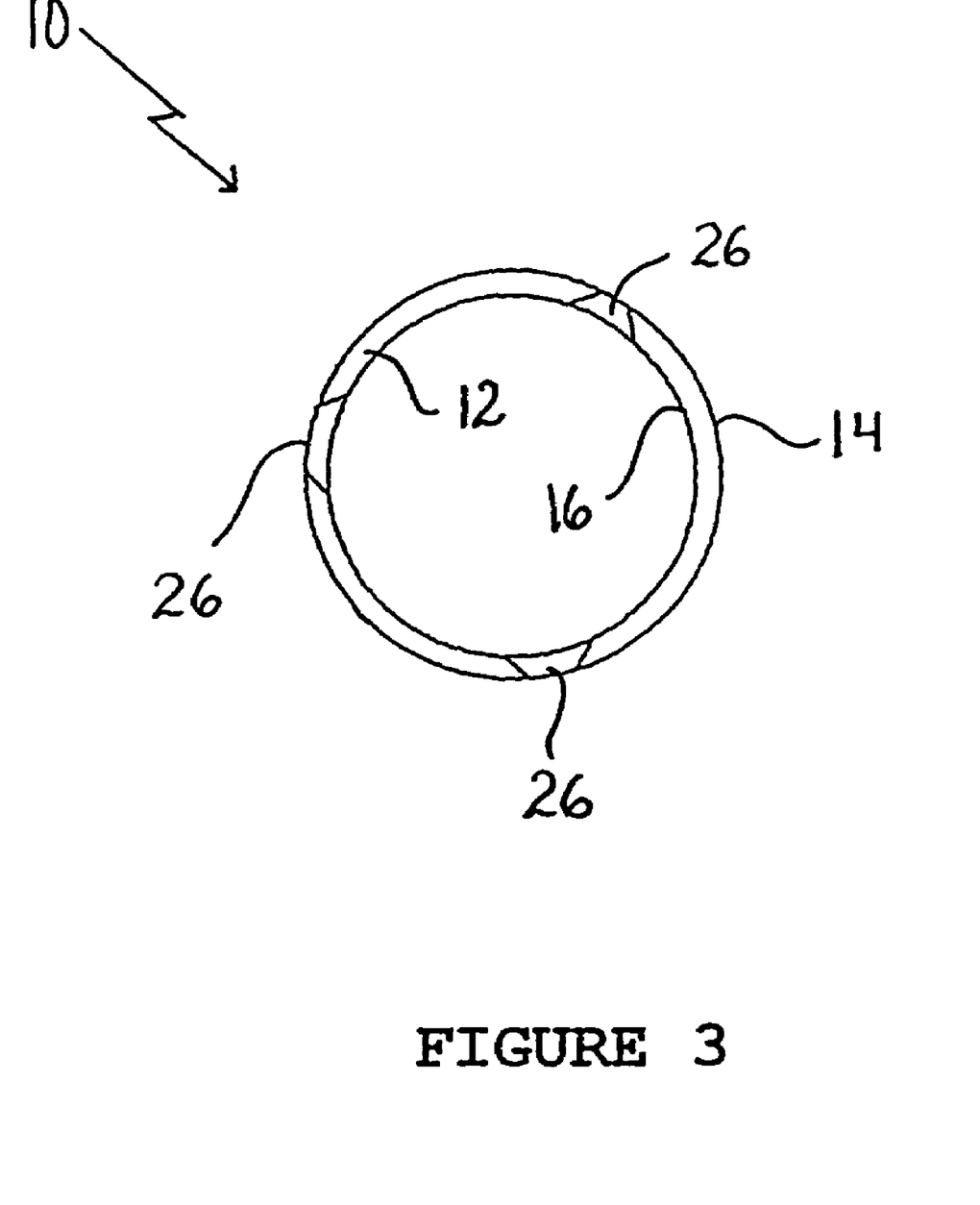
FIG. 3 is a top plan view, in section, of the diffuser illustrated in FIG. 1.
Figure 4:
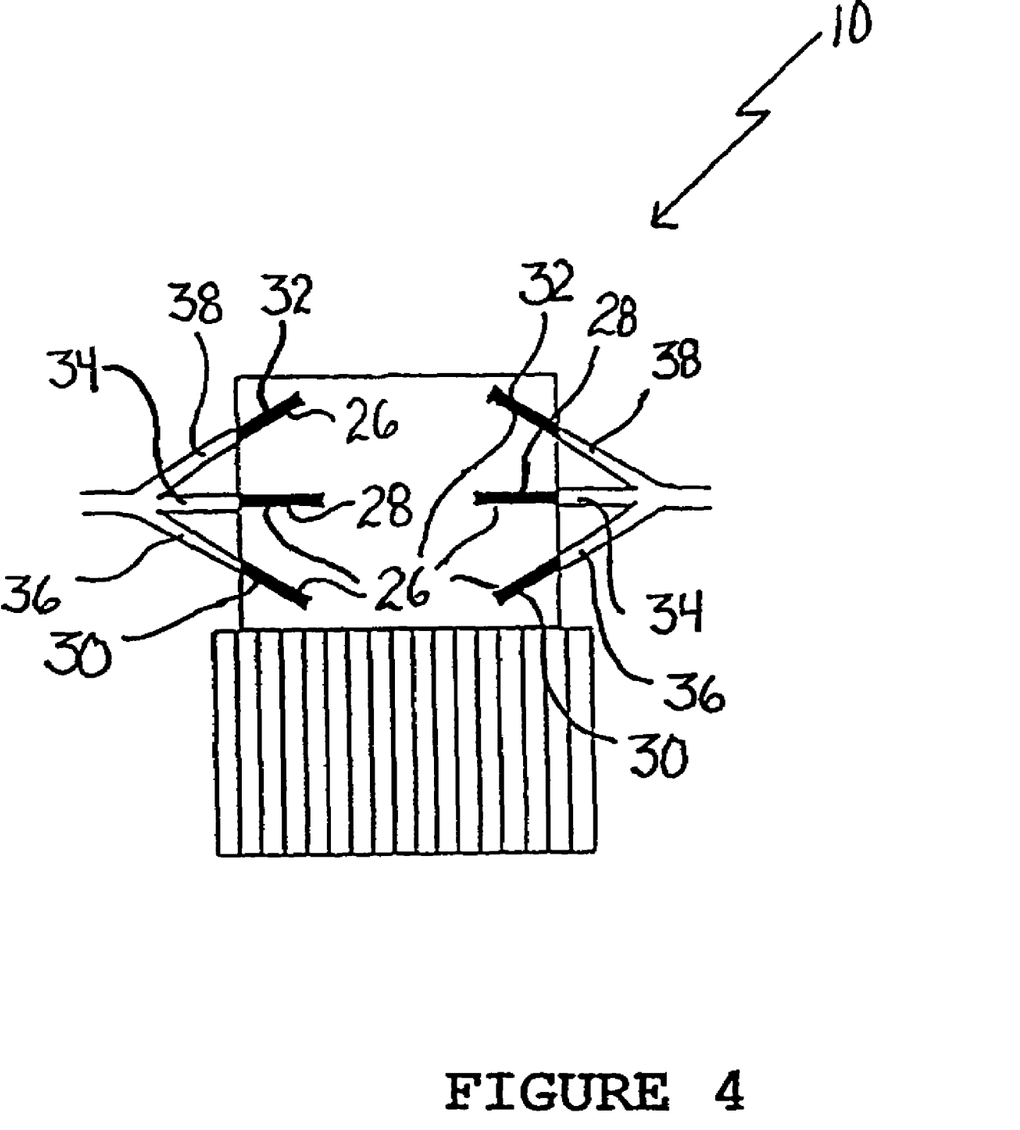
FIG. 4 is a detailed side elevation view of the diffuser illustrated in FIG. 1.

Structure and Relationship of Parts of Diffuser:

Referring to FIG. 2, diffuser 10 has a cylindrical body 12 with an outer surface 14 and an inner surface 16 defining a blind bore 18. Blind bore 18 has an open attachment end 20 and a closed impaction end 22. Open attachment end 20 has internal threads 24 positioned along inner surface 16 which are adapted for connection to a conduit as will hereinafter be further described. Referring to FIG. 1, body 12 has radially extending accurate slots 26. Referring to FIG. 2, fluids strike closed impaction end 22 and then are diffused radially from body 12 through slots 26. Referring to FIG. 3, slots 26 converge from inner surface 16 to outer surface 14. This increases exit the exit velocity of fluids diffused from body 12 through slots 26. Referring to FIG. 4, slots 26 are arranged in a configuration that includes a central slot 28, a lower slot 30 and an upper slot 32. Central slot 28 discharges a first fluid stream 34 substantially horizontally. Lower slot 30 is positioned below central slot 28 and discharges a second fluid stream 36 at an upward angle to impinge upon first fluid stream 34. Upper slot 32 is positioned above central slot 28 and discharges a third fluid stream 38 at a downward angle to impinge upon first fluid stream 34. It is preferred that lower slot 30 be angled at an upward angle of between 28 and 38 degrees and that upper slot 32 is angled at a downward angle of between 28 and 38 degrees. These angles have been demonstrated to achieve beneficial results. Optimization is believed to be achieved when lower slot 30 is angled at an upward angle within a narrower range of about 32 to 34 degrees and upper slot 32 is angled at a downward angle within a narrower range of about 32 to 34 degrees. For best results, it has been determined that diffuser 10 should be positioned in a substantially vertical orientation as illustrated in FIG. 1.

There will now be described a preferred, form of aeration apparatus 100 into which diffuser 10 is incorporated.

Figure 5:
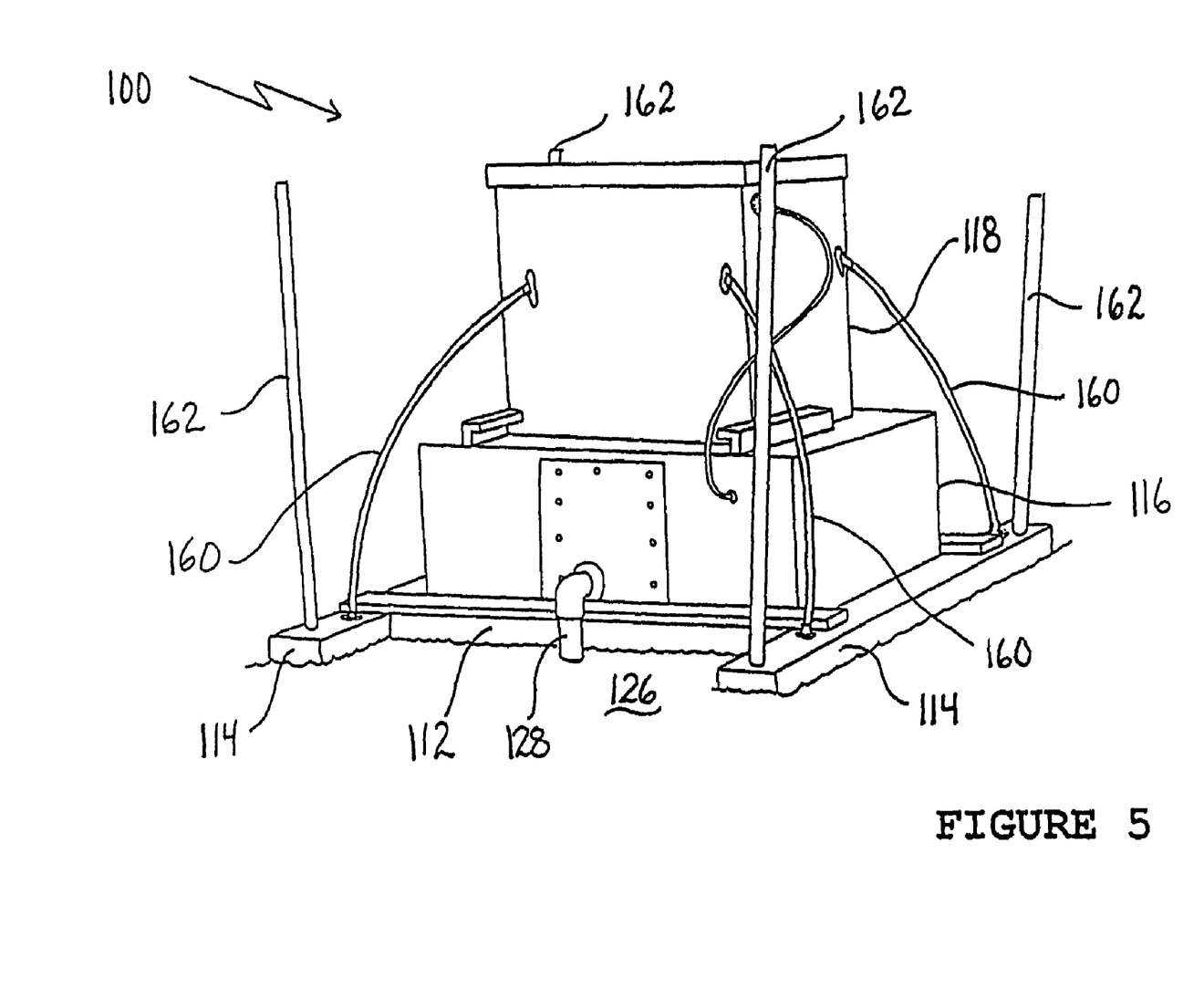
FIG. 5 is a perspective view of an aeration apparatus constructed in accordance with the teachings of the present invention.
Figure 6:
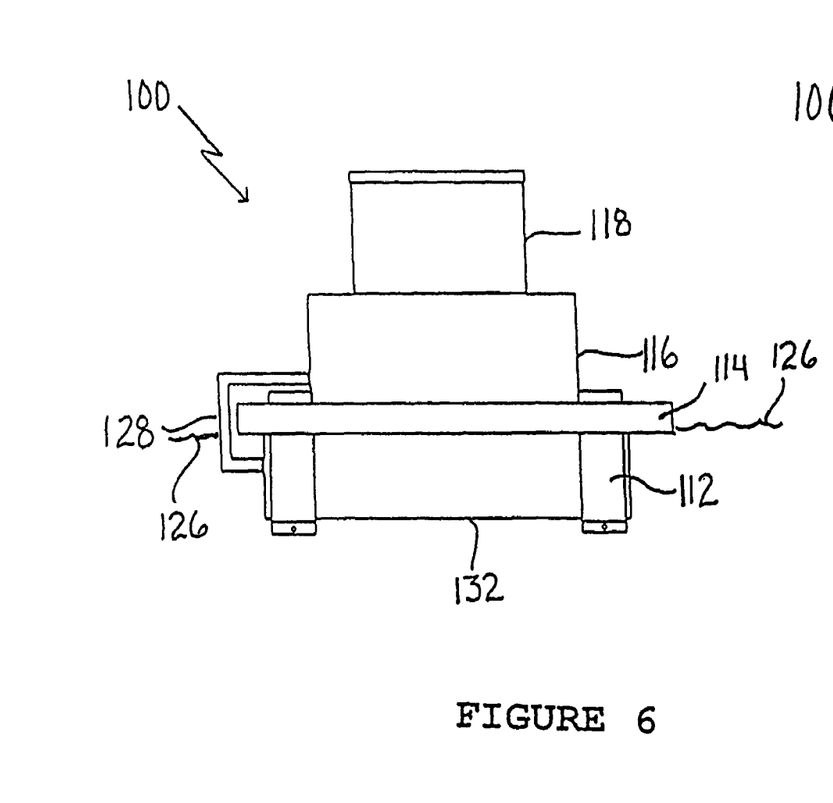
FIG. 6 is a side elevation view of the aeration apparatus illustrated in FIG. 5.
Figure 7:
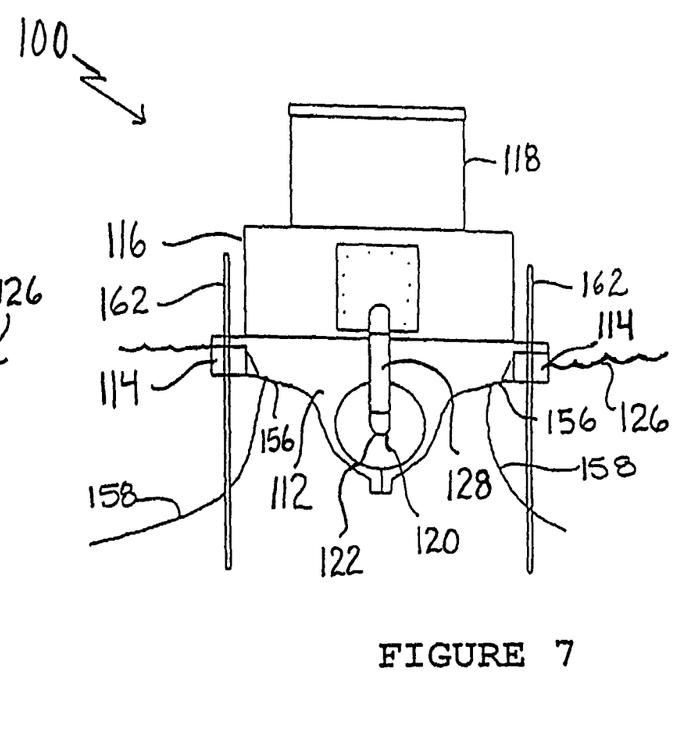
FIG. 7 is an end elevation view of the aeration apparatus illustrated in FIG. 5.
Figure 8:
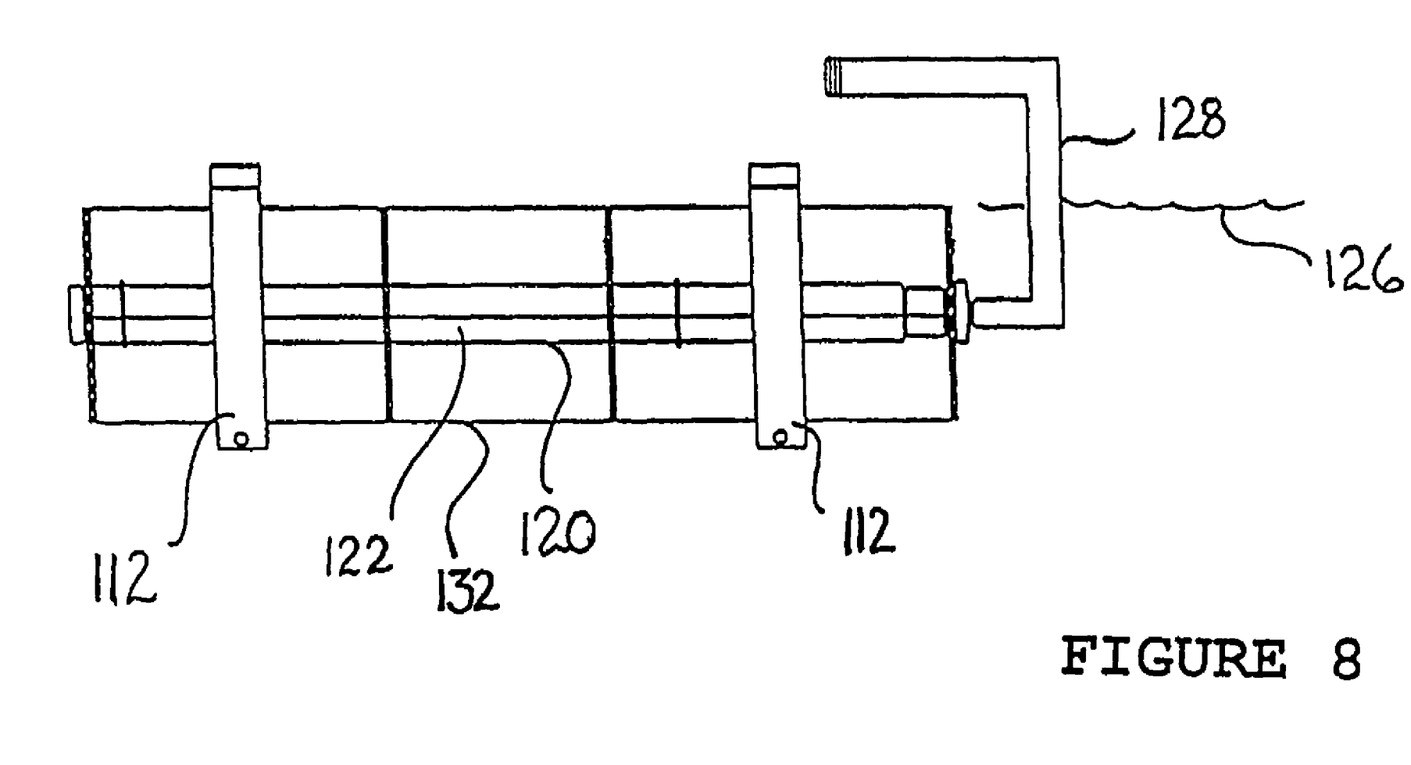
FIG. 8 is a side elevation view of the pump from the aeration apparatus illustrated in FIG. 5.

Structure and Relationship of Parts of Aeration Apparatus:

Referring to FIG. 5, aeration apparatus 100 includes a floating support 112 with purge tanks 114 that serve as floats for support 112. Referring to FIGS. 6 and 7, a diffusion chamber 116 is mounted on floating support 112. An oxygen generator 118 is also mounted on floating support 112 and discharges oxygen into diffusion chamber 116. Referring to FIG. 7, a pump 120 is mounted on support 112. Referring to FIG. 8, pump 120 has an intake 122. Referring to FIG. 7, in this particular embodiment pump 120 (including intake 122) is positioned below floating support 112. It will be appreciated that from this position pump 120 is able to draw water from a body of water 126 on which floating support 112 is floating. It will appreciated that pump 120 need not be a submersible pump as long as intake 122 for the pump is submerged. Referring to FIGS. 7 and 8, pump 120 has a discharge 128. Referring to FIG. 1, a primary conduit 121 is connected to discharge 128, so that primary conduit 121 is kept supplied with water by pump 120. A secondary conduit 123 is kept supplied with oxygen gas by oxygen generator 118. A venturi 125 is in fluid communication with both primary conduit 121 and secondary conduit 123. Venturi 125 is adapted to inject oxygen gas carried by secondary conduit 123 into water carried by primary conduit 121. Diffuser 10 is positioned within diffusion chamber 116 in a substantially vertical orientation. Attachment end 20 of body 12 of diffuser 10 is connected to primary conduit 121.

Referring to FIG. 7, diffusion chamber 116 has several drain passages 156. Each of drain passages 156 is coupled to a discharge line 158 which carries water that has been aerated a physical distance from floating support 112. It will be appreciated that any number of drain passages 156 and discharge lines 158 can be used, although beneficial results have been obtained with four.

Referring to FIG. 8, intake 122 for pump 120 is enclosed within a screen 132 so as to prevent debris in body of water 126 from being drawn into pump 120.

Figure 10:
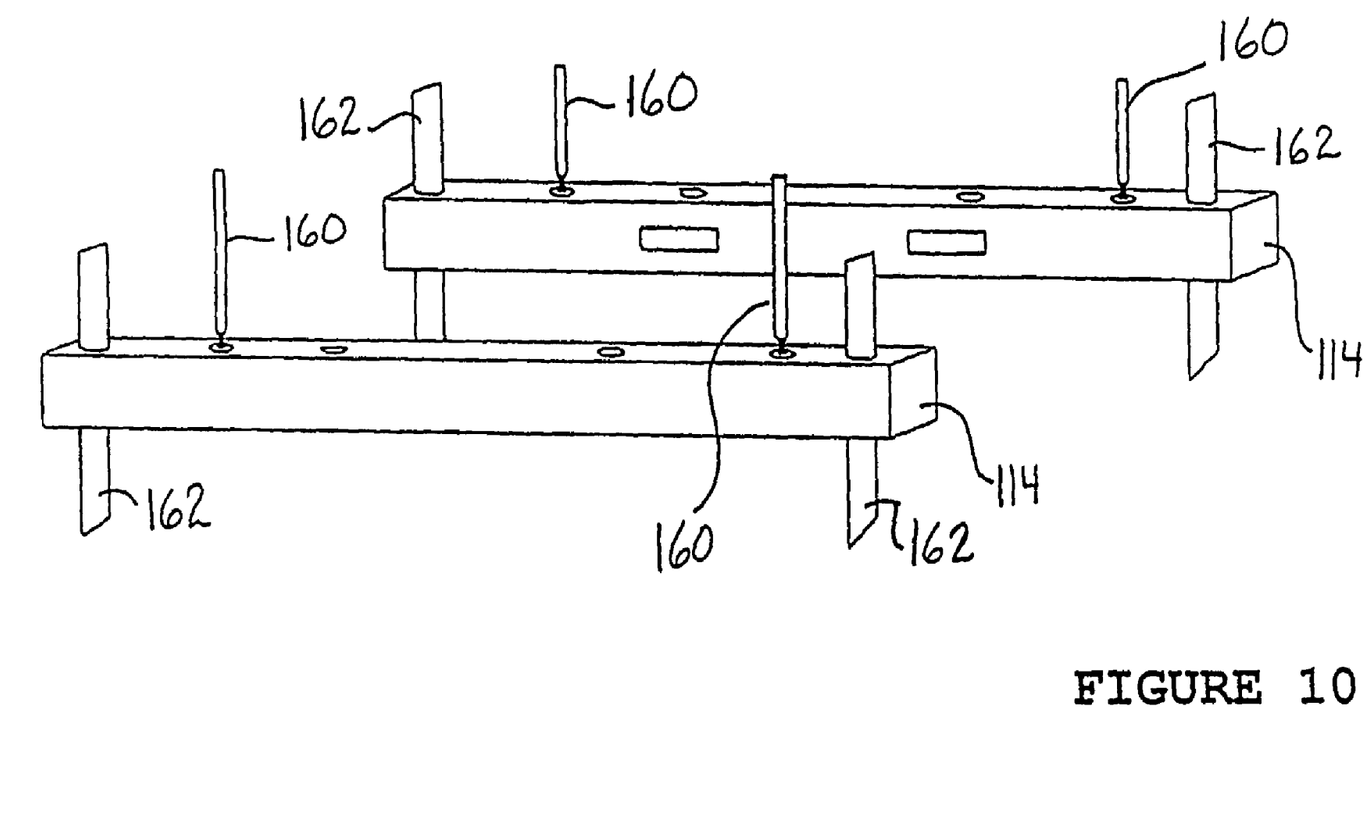
FIG. 10 is a perspective view of floats/purge tanks for the aeration apparatus illustrated in FIG. 5.

Referring to FIGS. 5 and 10, purge lines 160 extend from purge tanks 114 to oxygen generator 118.

Figure 9:
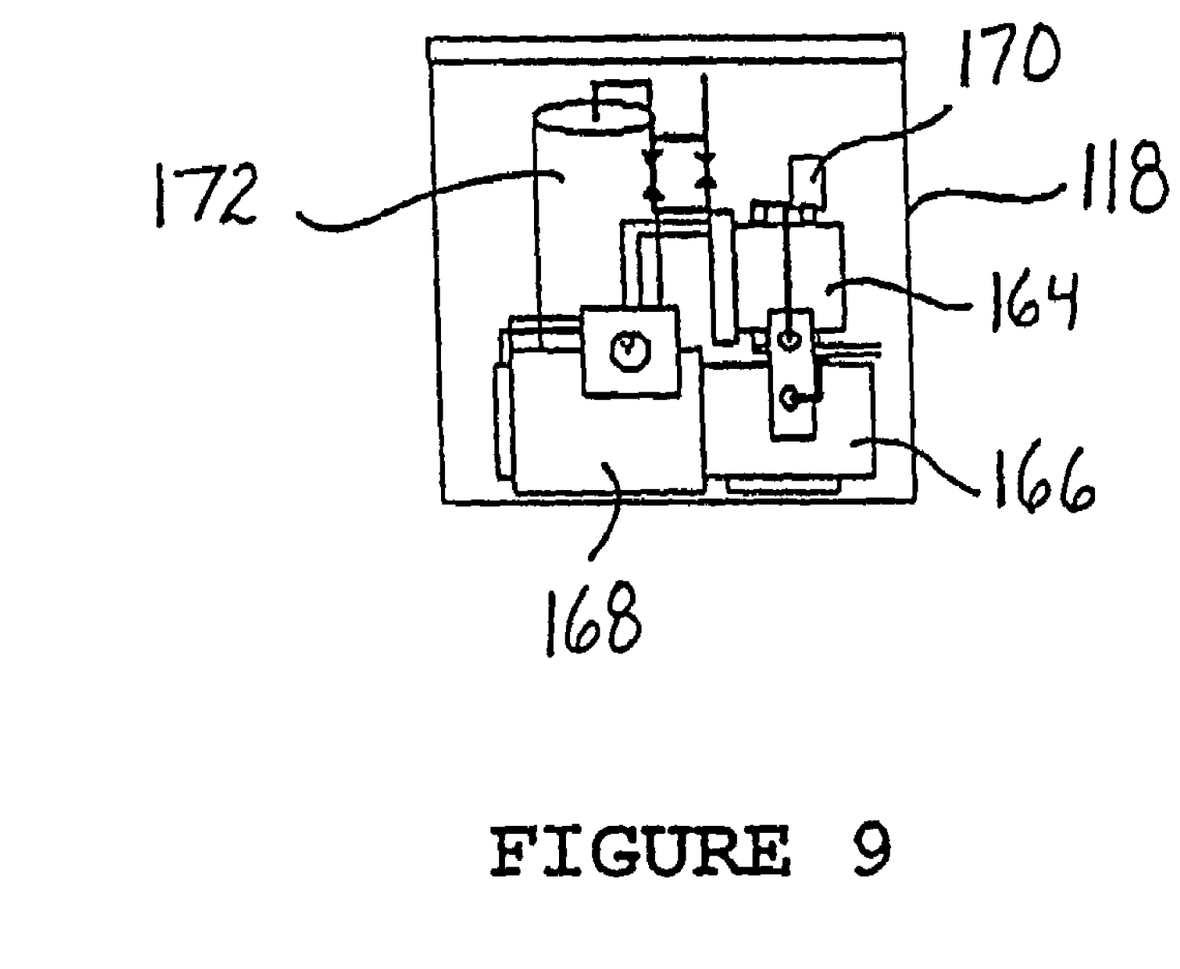
FIG. 9 is a front elevation view, in section, of the oxygen generator from the aeration apparatus illustrated in FIG. 5.

Referring to FIG. 9, oxygen generator 118 includes a control box 164, a motor 166, a blower 168, an exhaust intake 170 and a sieve bed 172.

Referring to FIGS. 5 and 7, floating support 112 has anchor pins 162. Floating support 112 is able to travel up and down anchor pins 162 as the water level of body of water 126 rises and falls.

Operation:

The use and operation of diffuser 10 and aeration apparatus 100 will now be described with reference to FIGS. 1 though 10. Referring to FIG. 5, aeration apparatus 100 is placed in body of water 126 where aeration of water is required. Referring to FIG. 6, aeration apparatus 100 is kept afloat on body of water 126 by purge tanks 114 which are mounted to floating support 112. Referring to FIGS. 5 and 7, anchoring pins 162 are used to anchor aeration apparatus 100 in a stable upright condition. Floating support 112 is able to travel up and down anchoring pins 162 as water levels in body of water 126 rise and fall.

Once suitably anchored, aeration apparatus 100 can be activated. Referring to FIG. 8, upon activation water from body of water 126 is drawn in through intake 122 of pump 120 and discharged through discharge 128. Referring to FIG. 1 water passes under pressure up primary conduit 121. Oxygen supplied by oxygen generator 118 passes under pressure along secondary conduit 123. Venture 125 injects oxygen into the water passing along primary conduit 121. Referring to FIG. 2, the aerated water passes from primary conduit 121 into blind bore 18 of diffuser 10. The path of the aerated water is blocked by closed impaction end 22. The aerated water strikes impaction end 22 of diffuser 10. This impact with impaction end 22 promotes aeration. Water then exits blind bore 18 through slots 26. Referring to FIG. 3, in view of the fact slots 26 converge from inner surface 16 to outer surface 14, the velocity of the aerated water increases as it is diffused from body 12 through slots 26. Referring to FIG. 4, lower slot 30 discharges second fluid stream 36 at an upward angle to impinge upon first fluid stream 34 from central slot 28. Upper slot 32, similarly, discharges third fluid stream 38 at a downward angle to impinge upon first fluid stream 34. The impact of the impinging streams further enhances aeration of the water. Diffuser 10 discharges into diffusion chamber 116. Oxygen which otherwise might escape to atmosphere is contained within diffusion chamber 116 thereby further enhancing aeration of the water. Referring to FIG. 7, water is drained from diffusion chamber 116 through drain passages 156 and carried by discharge lines 158 a physical distance from support 112.

Referring to FIG. 5, purge lines 160 enable oxygen to be cycled periodically from purge tanks 114 to purge oxygen generator 118. Referring to FIG. 9, sieve bed 172 absorbs nitrogen as air passes through and must be regenerated by purging the accumulated nitrogen. Every second cycle, approximately 15% of the oxygen is cycled back into oxygen generator 118 to purge sieve bed 172 of accumulated nitrogen.

The embodiment of the invention in which an exclusive property or privilege is claimed are defined as follows:

1. A diffuser (10) having a cylindrical body (12) with an outer surface (14) and an inner surface (16) defining a blind bore (18), the blind bore (18) having an open attachment end (20) adapted for connection to a conduit and a closed impaction end (22), the body (12) having radial slots (26), whereby fluids are diffused radially from the body (12) through the slots (26), the diffuser (10) being characterized by:
    a first slot (28) which discharges a first fluid stream (34) substantially horizontally;
    a second slot (30) which discharges a second fluid stream (36) to impinge upon the first fluid stream (34); and
    a third slot (32) which discharges a third fluid stream (38) to impinge upon the first fluid stream (34).

2. The diffuser (10) as defined in claim 1, wherein the first slot (28) is a central slot, the second slot (30) is a lower slot which is positioned below the central slot (28) and discharges the second fluid stream (36) at an upward angle, and the third slot (32) is an upper slot which is positioned above the central slot (28) and discharges the third fluid stream (38) at a downward angle.

3. The diffuser (10) as defined in claim 1, wherein the slots (26) are arcuate.

4. The diffuser (10) as defined in claim 1, wherein the slots (26) converge from the inner surface (16) to the outer surface (14), thereby increasing exit velocity of fluids diffused from the body (12) through the slots (26).

5. The diffuser (10) as defined in claim 2, wherein the lower slot (30) is angled at an upward angle of between 28 and 38 degrees and the upper slot (32) is angled at a downward angle of between 28 and 38 degrees.

6. The diffuser (10) as defined in claim 5, wherein the lower slot (30) is angled at an upward angle within a narrower range of about 32 to 34 degrees and the upper slot (32) is angled at a downward angle within a narrower range of about 32 to 34 degrees.

7. The diffuser (10) as defined in claim 1, incorporated into an aeration apparatus (100), comprising:
    a primary conduit adapted (121) for connection to a water source (120), the attachment end (20) of the diffuser (10) being connected to the primary conduit (121);
    a secondary conduit (123) adapted for connection to a gas source (118), the gas containing oxygen;
    a venturi (125) in fluid communication with both the primary conduit (121) and the secondary conduit (123), the venturi (125) being adapted to inject gas containing oxygen carried by the secondary conduit (123) into water carried by the primary conduit (121).

8. The aeration apparatus (100) as defined in claim 7, wherein the diffuser (10) is in a substantially vertical orientation.

9. The aeration apparatus (100) as defined in claim 7, wherein the gas source is an oxygen generator (118).

10. The aeration apparatus (100) as defined in claim 7, wherein the diffuser (10) is positioned in a diffusion chamber (116), at least one drain passage (156) communicating with the diffusion chamber (116) whereby the water after being aerated is drained from the diffusion chamber (116).

11. The aeration apparatus (100) as defined in claim 10, wherein the drain (156) is coupled to at least one discharge line (158) which carries the water that has been aerated a physical distance from the diffuser (10).

12. The aeration apparatus (100) as defined in claim 9, wherein the diffuser (10) is mounted on a floating support (112).

13. The aeration apparatus (100) as defined in claim 12, wherein the water source is a pump (12) mounted on the floating support (112), the pump (12) having an intake (122) positioned to draw water from a body of water (126) on which the floating support (112) is floating.

14. The aeration apparatus (100) as defined in claim 12, wherein the floating support (112) has anchor pins (162) and, when anchored, the floating support (112) is adapted to travel up and down the anchor pins (162) as the water level in the body of water (126) on which the floating support (112) floats rises and falls.

15. The aeration apparatus (100) as defined in claim 13, wherein the intake (122) for the pump (120) is enclosed within a screen (132), thereby preventing debris from being drawn into the pump (120).

16. The aeration apparatus (100) as defined in claim 12, wherein purge tanks (114) are used as floats for the floating support (112).

17. The aeration apparatus (100) as defined in claim 16, wherein purge lines (160) extend from the purge tanks (114) to the oxygen generator (118), oxygen being cycled periodically from the purge tanks (114) to the oxygen generator (118) to purge a sieve bed (172) of the oxygen generator (118) of accumulated nitrogen.

* * * * *